3,498,773
Patented Mar. 3, 1970

3,498,773
METHOD OF STRENGTHENING GLASS BY ION EXCHANGE
Everett F. Grubb, Toledo, and Augustus W. La Due, Maumee, Ohio, assignors to Owens-Illinois, Inc., a corporation of Ohio
No Drawing. Filed Feb. 23, 1966, Ser. No. 529,215
Int. Cl. C03c 21/00
U.S. Cl. 65—30      14 Claims

ABSTRACT OF THE DISCLOSURE

Processes for making bottles of container glass and improving the strength thereof by forming a bottle at a forming station, applying to the outer surface of the newly formed bottle an aqueous solution of potassium carbonate or other alkali metal salt having an alkali metal ion for exchange with a smaller alkali metal ion in the glass, transferring the coated bottle to an annealing station to provide an ion exchange of the alkali metal ions, moving the bottles through the annealing station, and cooling the bottle to provide a strengthened bottle.

---

This invention relates to a process for treating articles of glass, including glass components of articles, to improve the strength of the glass articles and also relates to the articles resulting from the treatment by the process. The present invention especially relates to a process for treating silicate glass composed of silica and alkali metal oxide or oxides, with or without one or more of other compatible constituents such as alkaline earth metal oxides, alumina, zirconia, titania, boron oxide, glass coloring oxides such as oxides of iron, cobalt, nickel, manganese, chromium and vanadium, and fining agents and also especially relates to the silicate glass article resulting from the treatment by the present process.

As used herein, the term "glass" means those inorganic glasses that (1) are not controllably crystallizable, and thus can be devitrified as the term is normally used, to form crystalline material usually in a matrix of a glass having a composition determined by the initial composition and by the composition of the crystalline material; (2) are controllably crystallized by a heat treatment; or (3) have been controllably crystallized by a heat treatment. Glass that is controllably crystallizable is commonly referred to as thermally crystallizable glass composition. A crystallized glass is commonly referred to as a glass-ceramic.

As described later in detail many types of silicate glasses, including glass-ceramics, that contain alkali metal ions have been treated at an elevated temperature by contact with an alkali metal inorganic salt for exchange of alkali ions in a surface portion of the glass with alkali metal ions of the inorganic salt. The usual process is an immersion of the glass in a molten bath of alkali metal inorganic salt or of a mixture of the alkali metal inorganic salt with other inorganic salts. The time of immersion is sufficient to cause this exchange only in a surface layer of the glass article. Lithium ions in a glass have been exchanged alternatively with sodium and potassium ions in molten inorganic salt baths. Sodium ions in glass have been exchanged with lithium and potassium of molten salt baths containing lithium and potassium inorganic salts.

Alkali metal ions have different ionic diameters as can be seen on page 900 of the 3rd edition of Van Nostrand's Scientific Encyclopedia, published in 1958 by D. Van Nostrand Co., Inc., Princeton, N.J. The lithium ion has the smallest ionic diameter. The ionic diameters of the other alkali metal ions are in the order: sodium, potassium, rubidium and cesium, with cesium having the largest ionic diameter.

When a larger alkali metal ion replaces a smaller alkali metal ion in the surface layer of glass at a temperature that is below the strain point of the glass, the surface layer then has a compressional or compressive stress. Apparently the larger ions try to occupy the smaller spaces previously occupied by the smaller alkali metal ions, thereby creating the compressional stress in the surface layer. Because the temperature of the glass is below the strain point, the glass structure cannot readjust itself to relieve the stress.

When a smaller alkali metal ion replaces a larger alkali metal ion in the surface layer of the glass the expansion coefficient of the surface layer will be changed to a lower value than that of the interior part of the glass article and with the result that the surface layer has a compressional stress. This ion exchange can be carried out at a temperature either below the strain point or at a temperature above the strain point but below the softening point of the glass. When the process of ion exchange is carried out below the strain point to replace a larger alkali metal ion in the glass with a smaller alkali metal ion, then the article after the actual exchange is then heated to a temperature sufficiently above the strain point to heal strength-reducing minute cracks occurring during the ion exchange treatment, due to the difference in the expansion coefficients of the interior and the surface layer. Then the stress and the resultant improved strength in the final product will be due to the compositional difference. When there is obtained by the ion exchange a surface layer that has a substantially lower coefficient of expansion than that of the interior glass, the ion exchange is performed as near to, but still below, the strain point as feasible, to avoid the creation of substantial cracks that would not be healed by the latter heating to a temperature above the strain point.

S. S. Kistler in a paper in the Journal of the American Ceramic Society, 45, No. 2, at pages 59–68, and Research Corp. in British Patent No. 917,388 describe an ion exchange process. The British patent mentions the following specific alkali metal inorganic salts that are suitable: $NaNO_3$; $KSCN$; $KNO_3$; $K_2S_2O_7$; $RbNO_3$. These are used in a molten form or as a solution in an organic, non-aqueous ionizing solvent, e.g., acetamide. As described in British Patent No. 917,388, the process comprises immersing the glass in a substantially anhydrous fluid bath containing alkali metal ions having an ionic diameter greater than the ionic diameter of alkali metal ions contained in the glass at a temperature not exceeding the strain point of the glass until a substantial portion of the alkali metal ions in the surface layer of the glass have been replaced by alkali metal ions of greater ionic diameter.

The liquid bath, either as molten salt or as solution of the salt in a non-aqueous ionizing solvent is stated as being maintained at a temperature high enough for ion exchange at a reasonable time and again is stated as being not above the strain point of the glass (about 470° C.) for ordinary soda-lime glass. The illustrative example used molten potassium nitrate at 350° C. for about 16 hours of immersion of the glass.

British patent specification No. 1,010,164 published Nov. 17, 1965, describes a process for treating a soda-lime glass to improve the strength by ion exchange using a temperature higher than actually used in the illustrative example presented in British Patent No. 917,388. The process of that British specification uses a molten potassium treating salt. The ion exchange is carried out with the salt at a temperature of at least 875° F., which is about 470° C.

Most of the examples of the ion exchange process of British specification No. 1,010,164 use a temperature of 950° F. for about 15 minutes of immersion. In some examples a temperature above 950° F., specifically 1050° F., was used but in this case the glass was immersed in the molten salt at that temperature for only a few seconds up to one minute, followed by heat treatment at 950° F. for about 15 minutes outside the molten bath. Instead of dipping the glass article in the molten potassium salt, British specification No. 1,010,164 further suggests the potassium salt contact with the glass surface by depositing the salt on the glass surface prior to raising the temperature of both to the elevated temperature required for the ion exchange. Obviously, at the treatment temperature the salt is in molten form. An alternative method also disclosed flows the molten salt on the glass surface while both are maintained at the treatment temperature.

The examples in British specification No. 1,010,164 use polished plate glass. According to page 17 of the book by E. B. Shand entitled "Glass Engineering Handbook," second edition, published in 1958 by McGraw-Hill Book Company, Inc., New York, N.Y., commercial plate glass has a strain point of 510° C. Thus in the examples of the process of ion exchange in British specification No. 1,010,164 are presumably below the strain point of the glass used, even though the specification teaches the use of higher temperatures for the ion exchange treatment with molten potassium salt. This British specification became available after the making of the present invention, but it is alegedly based upon a U.S. patent application having a filing date in 1967.

U.S. Patent No. 2,779,136 lists various alkali metal salts for use in molten form to ion exchange with alkali metal ions of a glass. Only two of these are the salts of inorganic acids and lithium. They are used alone, i.e., without admixture with other alkali metal salts. These two salts require the use of substantially high temperatures because of their high melting points. The melting points are reduced by mixing such salts with other alkali metal salts or alkaline earth metal salts. Even in such cases, the temperatures that have been used for the ion exchange with molten salt are still substantially high, presumably due to the high melting points of such mixtures.

Some molten alkali metal salts, such as potassium nitrate, are dangerous when used with the salt temperature above 750° F., because they can decompose spontaneously. Also metal nitrate salts, such as potassium nitrate, at such high temperature react very vigorously with organic material. In the manufacture of some glass articles, such as glass containers, molds are used. These molds are periodically lubricated by sprays of hydrocarbon material. Unless such material is removed from the glass surface prior to contact with molten potassium nitrate for ion exchange treatment, vigorous reaction can occur. It is not feasible to remove such organic material from the outer surface of a glass container right after it is taken from the mold, because the temperature of the container is a very high temperature. Also the container must be subjected to an annealing treatment before being cooled to room temperature or to a moderate temperature at which the organic material can be removed by washing.

It is an object of the present invention to provide a process of treating a glass article that uses an alkali metal salt as an ion exchange medium but does not require that the alkali metal salt, alone or admixed with other salts, be in molten form to replace another alkali metal ion in the surface layer of the glass.

It is a further object of this invention to provide a process of treating glass that uses an ion exchange medium that is liquid for easy application at room temperature or at a moderately elevated temperature but is changed in composition due to the vaporization of one or more liquid components to provide a solid film on the glass surface at the elevated temperature used for ion exchanging an alkali metal ion of the medium with another alkali metal ion in the surface layer of the glass.

It is still another object of the invention to provide a process of treating a glass as an article in which a hot freshly formed glass article prior to its annealing can be contacted with a fluid ion exchange medium to provide an alkali metal salt as a film on the glass in the desired surface area so that the surface can be ion exchanged by alkali metal ions of the salt with alkali metal ions of the glass during annealing of the glass article at a temperatures that are above the strain point of the glass.

Another object of the invention is to provide a process for treating a glass article by ion exchanging an alkali metal ion of the glass in a surface layer with an alkali metal ion of a treating medium that permits the use of a shorter period of time of treatment and at a higher temperature than used with molten alkali metal salts.

It is another object of the present invention to provide a glass article obtained by the process of this invention.

Other objects and advantages of the invention will be apparent from the description of the invention that follows.

The process of the present invention can be stated broadly as comprising (1) forming on at least an area of a surface of an article of glass, containing at least about 2%, preferably at least about 5%, by weight an alkali metal to be at least partially replaced, expressed as soda ($Na_2O$) mole equivalent, a substantially continuous layer of material consisting essentially of salt of a different alkali metal, (2) maintaining said surface area and said layer of material at an elevated temperature and for a period of time only for some of said alkali metal of the glass in the surface layer of the glass to exchange with said different alkali metal to provide a compressive stress in said surface layer of the glass in said area, and (3) cooling the glass article to a temperature at which said exchange does not occur, said layer of material and said alkali metal salt therein being solid at said elevated temperature and being removable from said glass after the elevated temperature treatment by dilute nitric acid. The alkali metal salt or mixture of these salts constitutes at least 90% by weight of said layer of material formed on the glass. Preferably the alkali metal salt is a salt, such as carbonate, that is alkaline in water and that is used alone or with other alkali metal salt and in such case can constitute substantially less than 90% by weight of layer of material when the molar ratio of alkali metal carbonate to other salt of that alkali metal is at least about 1:5.

The layer of material can be removed prior to or after the completion of the cooling step. In the embodiment in which the elevated temperature used is above the strain point, especially about or above the annealing point, further strength can be imparted to the glass by thermal tempering, which is a process that is well known in the art and which involves directing substantially cooler air to the surface of the hot glass to rapidly cool the surface layer to provide thereby a compressive stress in the layer with tensile stress in the interior of the glass article This stress will supplement that provided by the ion-exchange treatment at the elevated temperature.

The elevated temperature maintained in this process for the ion exchange is a maximum of about 50° C. (about 100° F.) above the annealing point of the particular glass being treated, if the glass is of other than glass-ceramic which has no annealing temperature as the term is defined. In the case of glass-ceramic the maximum temperature that is maintained for the ion exchange is about 750° C. (about 1400° F.). The preferred maximum elevated temperature is the annealing point of the glass being treated by the process of this invention. The elevated temperature at which the layer of material, containing alkali metal salt, and the glass article on which it is formed are maintained at an elevated temperature, as mentioned above, which is usually a temperature of at least about 200° C. but is preferably a temperature at or above the strain point of the glass being treated. It is necessarily above the strain point when the alkali metal in the glass is larger, as described below. It is especially preferred that this elevated temperature be between the annealing point of the glass being used and a temperature between 50° C. (about 100° F.) below the annealing temperature.

The layer and the alkali metal salt are such that neither melts nor decomposes at or below the elevated temperature used and neither the layer nor the salt melts nor decomposes at a temperature of 425° C. (about 800° F.). The alkali metal of the salt is preferably of an alkali metal that is immediately adjacent to said alkali metal in glass in the arrangement of alkali metals as Group I of the Periodic Table of the Elements.

When the alkali metal in the glass has a larger atomic radius than the different alkali metal of the salt, the elevated temperature of the process is above the strain point of the glass being used, to avoid the formation of a surface layer that will crack and separate from the main body of the glass article, for example, when sodium in a glass is replaced by lithium of a lithium salt layer on the glass surface.

When the alkali metal in the glass has a smaller atomic radius than the different alkali metal in the salt, the elevated temperature can be below the strain point of the glass but is preferably at least that of the strain point of the glass being used, and it is especially preferred that the elevated temperature be at about, but not above, the annealing point of the glass being used.

The period of time at which the layer and the area of the glass article are maintained at the elevated temperature is dependent on various factors, such as (1) the glass composition, including the particular alkali metal in the surface layer, (2) the salt of the different alkali metal, including the nature of the anion of the salt, whether the alkali metals of the glass and the salt are immediately adjacent (as defined above) and whether the alkali metal of the glass has the smaller or larger ionic radius, (3) the elevated temperature used, including whether this temperature is (a) below the strain point or (b) at or above the strain point, (4) the depth desired for the compressive stress to be obtained by the process, and (5) whether the salt or mixtures of salts at the highest portion of the range of elevated temperature etches the glass surfaces and such etch is desired or is to be avoided or minimized.

Thus the time can range between a few seconds to several minutes at temperatures near 1400° F. for glass-ceramic or at a temperature above the annealing point by a maximum of about 100° F. for the other types of glasses. When the temperature for ion exchange is in the range of the strain point and about the annealing point of the glass being used, the time can range between a few minutes to about a few hours, and the time varies inversely with the temperature. At about the annealing temperature the time is preferably more than five minutes and less than 30 minutes. When the temperature is below the strain point of the glass being treated, the time is between about one-half hour to about 24 hours, with the time also varying inversely with temperature.

In the process of this invention the layer of material consisting essentially of the salt of the different alkali metal can be formed on the area of the glass article by any of numerous techniques. For example, this layer can be formed by spraying this surface area of the glass article with a fluid, as a liquid stream or a spray of liquid droplets in a gas stream, that is a mixture containing the alkali metal salt and liquid, such as water, an organic material and compatible mixtures thereof. The organic material is liquid at the temperature at which the mixture is sprayed onto the glass surface.

The organic material, when used in place of or with water, is an organic compound or mixture of organic compounds that will impart adherence of the alkali metal salt to the glass surface and yet will volatilize, with or without decomposition, or burn off at a temperature below or at the temperature maintained for the ion exchange step of the process without adversely affecting the adherence of the alkali metal salt to the surface of the glass article so that the alkali metal salt will form a substantially continuous layer of solid material on the sprayed area of the glass surface. Of course, more than one alkali metal salt may be used, provided the mixture of these salts does not have a melting point at or below the elevated temperature at which the layer and the glass article are maintained for the ion exchange.

Water is the preferred liquid that is used admixed with the alkali metal salt to form via the spray technique a substantially continuous layer of material containing alkali metal salt. If the glass is at the elevated temperature used for the ion exchange step, the water of the spray will volatilize from the glass surface and leave the solid material, consisting essentially of alkali metal salt, as a solid layer on the glass surface. Also, if the liquid spray is used on the glass article at a temperature below that elevated temperature, the water content of the spray will be removed by volatilization as the article and the spray coating thereon are raised to the elevated temperature. It is preferred that the fluid mixture be applied to the glass article which is at a temperature above the boiling point of water to permit by one spray application the formation of the solid layer with a sufficient depth to provide enough alkali metal salt for the desired degree of ion exchange. Thus the temperature of the surface of the glass to which the spray, containing water and alkali metal salt, is applied is preferably above about 300° F. (above about 150° C.), and for certain utilizations of the process it is preferred that the temperature be at least above about 600° F. to 900° F. (above about 315° C. to 485° C.).

The mixture of liquid, either water and/or organic material, and alkali metal salt contains a sufficient concentration of the latter to provide a minimum amount of spraying to form a layer of solid material that will provide the ion exchange to the desired degree. This mixture, that is sprayed, is preferably a solution of the salt in the liquid, either water and/or liquid organic material. Slurries of alkali metal salt and liquid, either water and/or liquid organic material may be used as the spray material. The preferred solutions are aqueous solutions that are saturated with the salt or the salts at a temperature at which the aqueous solution is used in the spray directed to the glass article.

Another way of forming this layer containing alkali metal salt in the surface area of the glass article is by dipping or immersing this surface portion of the glass article in the fluid mixture followed by removal of the glass article before its maintenance at the elevated temperature for ion exchange. In this case, fluid mixture adheres to the surface area by dipping or immersion and before or at the elevated temperature water or volatile organic material leaves to leave an adherent layer of solid material consisting essentially of one or more of salts of said different alkali metal with or without (preferably without) one or more salts of another alkali metal and/or other metals. In any event, the solid layer must be of such composition that it remain solid at the elevated temperature utilized for the ion exchange step of the process.

For the dipping or immersion technique as part of the formation of the solid layer on the glass, aqueous solutions of the alkali metal salt or salts are preferred. Especially preferred are saturated aqueous solutions, as mentioned above for the spray technique.

Organic materials used to provide an adherent layer of alkali metal salt that is substantially continuous on the surface area may be chosen from a wide variety of organic compounds, individually or as mixtures. The preferred organic material is a mixture of nitrocellulose and amyl acetate, that is used to provide a suspension or slurry of the alkali metal salt. This suspension or slurry, when it is sprayed on a surface area of a hot glass article, will burn clean and there will be formed a solid, adherent film or layer of alkali metal salt. The organic material used is required, of course, to be a material that does not react with the alkali metal salt.

Other techniques of applying the layer of solid material is by applying the mixture of salt and liquid by a brush or squeegee or through a screen or by placing a porous sheet containing the mixture in its pores against the glass surface.

As described later, there are many types of glasses that contain alkali metal oxide that can have alkali metal ions in the surface layer replaced by other alkali metal ions of salt in the layer formed on the glass. Some of these alkali metal salts, that are suitable for use in the present process, have been used at an elevated temperature, but only when admixed with other alkali metal salts in which the mixture is liquid at the elevated temperature used heretofore for the ion exchange.

Potassium nitrate has been used in the prior art to replace sodium in a glass with potassium at a temperature at which the potassium nitrate is liquid. Mixtures of potassium nitrate with other potassium salts, such as potassium chloride and potassium sulfate, have been used to provide the liquid ion-exchange bath medium. In such mixtures the potassium nitrate constitutes the predominant mole percentage.

In the process of the present invention some alkali metal salts, used heretofore, such as potassium sulfate and potassium chloride, admixed with nitrate salts of the same alkali metal or another alkali metal to provide a liquid ion-exchange bath, are used alone. They have melting points above the elevated temperature at which the ion-exchange step is conducted. They are used in the present invention with salts of alkali metal that have not been used heretofore, such as carbonate salts of alkali metal, that have melting points above this elevated temperature, provided that the mixture as a layer is solid at the elevated temperature of the present process. For example, in the replacement of at least part of sodium ions in the surface layer of glass with potassium ions by using potassium salt or salts, the present invention utilizes such potassium salts as potassium carbonate (M.P. of 891° C.), potassium chloride (M.P. of 790° C.), potassium sulfate (M.P. of 1069° C.), potassium bromide (M.P. of 730° C.), potassium iodide (M.P. of 723° C.), potassium tribasic phosphate (M.P. of 1340° C.) and potassium metaphosphate (M.P. of 807° C.). They are salts of potassium that have melting points above the annealing point of most of the glasses that are ion exchanged by the present process and some of these salts have melting points above the annealing point of all the glasses treated by the process of the present invention that have annealing point and above 1400° F. for those glasses that are glass-ceramics. Examples of lithium salts that have suitable melting points are lithium carbonate (M.P. of 618° C.), lithium chloride (M.P. of 614° C.), lithium bromide (M.P. of 547° C.), lithium sulfate (M.P. of 860° C.), and lithium tribasic phosphate (M.P. of 837° C.). When using sodium salt to replace, e.g., lithium or potassium in glass by the present process, suitable salts are sodium carbonate (M.P. of 851° C.), sodium chloride (M.P. of 800° C.), sodium bromide (M.P. of 755° C.), sodium iodide (M.P. of 651° C.), sodium sulfate (M.P. of 884° C.), sodium pyrophosphate (M.P. of 988° C.) and sodium metaphosphate (M.P. of 628° C.). The comparable salts of rubidium and cesium can be used, with their suitable hgh melting points, to replace other alkali metals or each other.

The terms "annealing point" and "annealing temperature" is used herein mean the same thing. E. B. Shand in his book, mentioned above, at pages 21 and 22 defines annealing point as the temperature at which the internal strains in glass are reduced to an acceptable limit in 15 minutes and that the glass temperature has a viscosity of $10^{13}$ poises. He states it is determined by a test (ASTM Design. C336–54T) which is made with a weighted glass fiber in a furnace cooled at a rate of 4° C. per minute. The annealing-point temperature is determined from rates of elongation of the fiber. That book on page 22 states that the strain point is the temperature at which the internal stresses are reduced to low values in 4 hours. At this viscosity, which is $10^{14.5}$ poises, the glass is substantially rigid. The data for determining the strain point are obtained by using the same procedure that is used for the annealing point, but for a slower rate of fiber elongation.

The flexural strength or modulus of rupture of glass can be determined by a number of testing methods. A common method uses the Tinius-Olsen testing machine. The glass is tested as a rod that is, for example, 5 inches long and has a diameter of about 3/16 inch. This machine applies a measured load through a single knife edge to the center of the sample rod supported on two knife edges that are four inches apart (3-point loading). The load is applied at a constant rate of 24 lbs. per min. until failure occurs with a marker indicating the highest load applied to the point of failure. A dial micrometer calibrated in inches and equipped with a bar contact instead of a point contact is used to measure the maximum and minimum diameters at the center of the sample to an accuracy of 0.0005 inch. Since few sample rods are perfectly round, the load is applied normal to the maximum diameter and the standard formula for an elliptical cross-section is used in calculating the modulus of rupture as follows:

$$MR = \frac{(10.185) \times \text{load}}{D_1^2 \times D_2}$$

The modulus of rupture in this formula gives the flexural strength in pounds per square inch of cross-sectional area at failure. The glass rods are obtained by cutting cane pulled from molten glass.

The flexural strength of rods, with or without ion-exchange treatment, can be determined by this method and compared with the flexural strength of such rods after subjecting them to a substantial degree of abrasion. Several methods of abrasion have been developed. One example of abrasion comprises tumbling the rods for 15 minutes in a ball mill containing No. 30 silicon carbide grit. This type of abrasion can substantially reduce or eliminate the increase of flexural strength afforded by ion exchange. It is believed that this type of abrasion in much too severe for the evaluation of ion-exchange strengthening of glass that is to be utilized in the form of certain products, such as glass containers, that will not be subjected in service to this severity of abrasion. With such severe abrasion it is necessary that the depth of the compressive stress layer be at least about 50 microns. However for certain products, such as glass containers, a depth of compressive stress layer of at least about 10 microns is sufficient to retain a substantial degree of increase of strength, afforded by the ion-exchange treatment, during the use and reuse of such products for a reasonable period of time.

Glass bottles or containers can be tested for impact strength using the Preston impact testing machine, Model 400, which is marketed by American Glass Research, Inc., Butler, Pa. It is described in a pamphlet originally issued by Preston Laboratories, Butler, Pa. This machine has a pivotally mounted hammer which is raised to an angle relative to a vertical plane. The striking face is a hardened steel ball. The machine can be adjusted to provide impact at any of several locations of a bottle placed in position on a machine. For example, impact can be against the shoulder of the bottle to provide in degrees of pendulum drop, i.e., degrees of drop of the hammer as a meassure of the strength. The maximum number of degrees of arcuate movement is the minimum angle that produces breaking of the bottle at the shoulder. Instead of expressing the result in degrees it can be expressed as shoulder impact strength in inch-pounds.

To determine the loss of the strength of bottles as a result of service use, there has been developed a machine that simulates the type of abuse received by bottles when they are fed to and taken away from the filling station in a plant where the bottles are filled with products. This machine is known as the Consumer Line Simulator, also referred to as the CLS Abuser, and is described in report No. 62-127 of Dec. 13, 1962, issued by American Glass Research, Inc., Butler, Pa. Abuse for one minute using this device is supposed to be equivalent to the amount of abuse that glass containers receive in one year of service. Of course, this refers to returnable bottles which go through the product filling station a number of times within a year.

The following examples illustrate preferred embodiments of the present invention using various alkali metal salts and using various types of glass, illustrative of those that are ion exchangeable by the present process.

EXAMPLE I

One-way beer bottles, that were made of a conventional flint container glass and are referred to by assignee as GB-2000 bottles, were sprayed with aqueous salt solutions immediately after the formation of these bottles and thus prior to their annealing. The bottles at the place of spraying would be at temperatures between about 600° F. and about 900° F., as previously determined. The temperature of bottles at the spraying location varied in temperature study because they were from different molds of an IS machine and were different styles of bottles.

Some bottles were sprayed on their outside surface with an aqueous solution of potassium carbonate. Some were sprayed on their outside surface with an aqueous solution containing two salts using 80 mole percent potassium carbonate and 20 mole percent potassium chloride. These solutions were prepared by heating water to boiling temperature and adding salt or mixture of salts to dissolve as much salt as possible. The aqueous solution was cooled to room temperature to provide saturated solutions in the presence of solid salt. The hot, newly-formed bottles after being sprayed with these saturated salt solutions, were immediately run through the annealing lehr to receive the normal annealing-temperature treatment that unsprayed bottles receive in their manufacture.

A temperature profile in a normal annealing lehr has been determined using a traveling thermocouple attached to the bottom of a bottle. This temperature profile determination indicates that for about the last one-half of the initial 5 minutes the temperature of the bottom of bottle was rising from about 980° F. and then in the next 5 minutes the bottom of the bottle was at a temperature between 1000° F. and 1025° F. After the first 10 minutes the temperature decreases. At the end of about 15 minutes overall, the temperature was reduced to 900° F. and at the end of 20 minutes overall it was reduced to about 600° F. followed by still further cooling. The total travel time through the lehr is about 40 minutes. The temperature in the sidewall portion of the bottle passing through lehr will be ahead of the temperature of the bottom during the heat-up period and will retain that temperature of the bottom during the cooling period.

The glass of these bottles has an annealing point of 1033° F. and a strain point of 986° F. This glass has the following theoretical composition, expressed as oxides in weight percent:

| | |
|---|---|
| $SiO_2$ | 72.0 |
| $Al_2O_3$ | 1.9 |
| CaO | 9.6 |
| MgO | 4.2 |
| $Na_2O$ | 11.5 |
| $K_2O$ | 0.4 |

This is a conventional soda-lime-silica container glass. Its manufacture is described in many places in the literature including E. B. Shand's book mentioned above as well as "Handbook of Glass Manufacture" by Tooley published in 1953. A typical batch composition for this glass is as follows on a weight percent basis:

| | |
|---|---|
| Sand | 57.1 |
| Soda ash | 15.8 |
| High calcite lime | 5.9 |
| Raw dolomite | 14.6 |
| Nepheline syenite | 6.1 |
| Salt cake | 0.5 |

The bottles after exiting from the annealing lehr and cooling to room temperature were washed with dilute nitric acid. An examination of the bottles indicated that they had on their outer surface a 15-micron depth of surface compressive stress layer.

Part of the bottles from each type of spray-and-heat treatment were subjected to 10 minutes of abuse with the CLS abuser. These and the other ion-exchange bottles that were not subjected to abuse were tested for shoulder impact strength. Bottles of the same type, but that had been through the annealing lehr and had not been sprayed with aqueous salt solution, were tested also for shoulder impact strength. Some of these untreated bottles were abused by the CLS abuser for 10 minutes prior to testing for impact strength. The degree of pendulum drop increases with increase in shoulder impact strength. The following tabulates the data for shoulder impact strength of the one-way beer bottles untreated and those sprayed with two different salt solutions and heat treated, all without abuse. The other values are the strengths on other bottles of these groups after the 10-minute abuse.

| | Untreated | $K_2CO_3$ | $4K_2CO_3/KC$ |
|---|---|---|---|
| No abuse, deg | 79 | 67 | 49 |
| Abused, deg | 44 | 63 | 52 |

The foregoing data show clearly the increase of strength obtained by the alkali metal salt treatment at the elevated temperature and its substantial retention after a greater amount of abuse than the bottles would be expected to receive. The data also show the advantages of using potassium carbonate alone as compared with the specific mixture of it and potassium chloride as the alkali metal salt layer on the glass during the elevated temperature treatment.

EXAMPLE II

One-way beer bottles, having the glass composition described above in Example I, were broken into pieces that were melted in a pot. The molten glass was used to draw cane from which rods were prepared for treatment in accordance with this process. Of course, this glass has the strain point and annealing point mentioned in Example I. The rods were preheated to 700° F. in an oven. Immediately upon removal from the oven they were sprayed with one of two aqueous salt solutions. These were saturated solutions, prepared as described above in Example I, of potassium carbonate and potassium sulfate. The sprayed rods were then placed in an oven maintained at the desired temperature. For each temperature, some rods were maintained in the oven for a longer period of time then others. The heat-treated, coated rods then were cooled slowly to room temperature and washed for removal of the salt coating. The rods coated with potassium carbonate, were washed with the dilute nitric acid. Those coated with potassium sulfate were washed with water. The rods were examined for depth of compressive stress surface layer. All had a compressive stress in that layer. Samples from the rods and having a thickness of about 0.0008 inch were examined for compressive retardation expressed in millimicrons.

The data are tabulated below for the different times and temperature treatment.

| Salt used | Temp., °F. | Time, minutes | Depth of layer | Stress retardation |
|---|---|---|---|---|
| $K_2CO_3$ | 1,050 | 5 | 11 | 190 |
| | | 15 | 22 | 180 |
| | | 30 | 22 | 150 |
| $K_2CO_3$ | 1,025 | 5 | 11 | 210 |
| | | 15 | 11 | 180 |
| | | 30 | 20 | 150 |
| $K_2CO_3$ | 1,000 | 5 | 11 | 210 |
| | | 15 | 30 | 180 |
| | | 30 | 17 | 220 |
| $K_2CO_3$ | 975 | 5 | 11 | 200 |
| | | 15 | 11 | 200 |
| | | 30 | 18 | 200 |
| $K_2SO_4$ | 1,025 | 5 | 4 | 50 |
| | | 15 | 6 | 50 |
| | | 30 | 8 | 50 |

The greater is the depth of the layer of compressive stress, the greater is the resistance to loss of increased strength by abuse. This depth of layer should be at least 10 microns, as mentioned above, and is preferably at least 15 microns. The greater is the compression retardation, the greater is the increase in strength. However, a bottle having a greater compression retardation as a result of the ion-exchange treatment than another bottle that has a greater depth of compressive stress layer is not necessarily better from the standpoint of commercial use. Retention of increased strength, during use, is assured by layer depth and not by amount of compression retardation. The data for potassium sulfate treatment indicate that it is less effective as an ion exchange medium than potassium carbonate. At the temperature used potassium sulfate did not provide a sufficient depth of compressive stress surface layer to afford a retention of satisfactory increase in impact strength during a service-simulated abuse. However, the data for potassium sulfate treatment indicates that there can be a definite increase in strength of the glass article as a result of this potassium sulfate treatment in accordance with the present invention. This strength increase can be retained by coating the treated and washed bottles with an organic coating to impart lubricity and thus avoid or minimize damage during use, especially in a product filling line.

Although the potassium carbonate treatment at 1050° F. for 30 minutes had a compressive stress layer, other experiments indicate that this is about the period of time of treatment beyond which the rate of compressive stress retardation at that temperature begins to decrease. The stress provided by the ion-exchange treatment for a longer period of time eventually provides a surface layer that has a tensile stress. It will be noted that the stress retardation, as compared with the 15-minute treatment, is lower for the 30-minute treatment. This indicates that at 1025° F., additional time of the heat treatment will result in loss of compressive stress along with the creation of a tensile stress.

The data show that the desired depth of compressive stress layer is attained faster using temperatures above the strain point and greater depths are also obtained as compared with a temperature slightly below the strain point, namely, 975° F.

EXAMPLE III

One-way beer bottles (GB–2000 size and shape) were made but using a molten glass having the following composition expressed as oxides on a weight percent basis:

| | |
|---|---|
| $SiO_2$ | 72 |
| $Al_2O_3$ | 3 |
| MgO | 10 |
| $Na_2O$ | 15 |
| $K_2O$ | 0.5 |

This glass has an annealing point of 1028° F. and a strain point of 980° F. This soda-containing glass and its method of manufacture are described and claimed in co-pending U.S. patent application Ser. No. 504,160, filled on Oct. 23, 1965, by William E. Smith with common assignee and entitled "Process and Product." The advantage of such glass composition for an ion-exchange treatment is described in that application with reference to the already known process of immersing a glass article in molten potassium nitrate. The examples described in that patent application used a treatment of rods of that glass composition for 8 hours at 400° C. That patent application also claims the glass article resulting from ion-exchange treatment, i.e., the glass with a compressive stress surface layer. The detailed description of this type of glass composition as set forth in said patent application is hereby incorporated by reference. Briefly, the glass is an alkali-alkaline earth silicate glass composition comprising on a weight basis about 12% to about 20% $Na_2O$, about 5% to about 20% MgO, between 0% and less than 10% $Al_2O_3$, 0% to about 2% $Li_2O$, 0% to about 5% $K_2O$, 0% to about 5% CaO, and $SiO_2$, said $Na_2O$ and MgO constituting at least 23% of the glass, said $Na_2O$, MgO, $Al_2O_3$ and $SiO_2$ constituting at least 90% of the glass, the weight ratio of CaO:MgO being a maximum of 1:1, said $Li_2O$ content being a maximum of about 1% in the absence of $Al_2O_3$ and said glass composition having in the absence of $Al_2O_3$ content a mole ratio of MgO:$Na_2O$ between 0.4:1 and 1.25:1 and in the presence of $Al_2O_3$ content a mole ratio of total of MgO and $Al_2O_3$ to $Na_2O$ between 0.5:1 and 1.25:1. This glass preferably has a maximum weight ratio of CaO:MgO of 0.5:1 and a maximum CaO content of about 2.5%. The total of $Na_2O$, MgO, $Al_2O_3$ and $SiO_2$ contents preferably constitutes 95% of the glass.

These bottles, directly from the bottle forming station of the IS machine, were sprayed on their outside surface with aqueous potassium carbonate solution, prepared as described in Example I, to provide a substantially uniform coating or layer of potassium carbonate upon evaporation of the water content. These bottles were also passed through the annealing lehr with the temperature profile indicated in Example I. At the exit end of the lehr the bottles were removed, cooled to room temperature and washed with dilute nitric acid for removal of the salt layer. Again the shoulder impact strengths for bottles were determined using the Preston standard impact machine, with and without prior abuse using the CLS abuser. Other bottles of this glass composition, that were made at about the same time but were not sprayed, were passed through the annealing lehr and were also tested for shoulder impact strength. None of these bottles was subjected to abuse. The bottles, that were subjected to the potassium carbonate treatment at the lehr temperature, had compressive stress layers with a depth that varied from one bottle to another between 10 and 14 microns and they had an average compressive retardation value of 170 millimicrons. The average impact strength of the untreated bottles was 4.8 inch-pounds. The potassium carbonate treated bottles, without any abuse, had an average impact strength of 14 inch-pounds. The average impact strength for the bottles treated with potassium carbonate at the elevated temperature and subjected later to abuse was 16 inch-pounds. These are average values. The fact that the value after abuse is higher than the treated bottles without abuse is not indicative. However, it does indicate that the layer depth is sufficient to provide retention of increase of strength under the longer time of abuse than conventionally used to test bottles.

EXAMPLE IV

Rods of the flint container glass were made as described in Example II and each subjected to a spray of an aqueous salt solution. The rods had been preheated as in Example II. They were either placed in an oven as described for the bottles in Example II or were immediately placed in the annealing lehr described above in connection with Examples I and III for the temperature treatment as described in Example I. This salt content of the aqueous solutions was saturated, and these solutions were prepared as described in Example I. Five types of aqueous solutions were used and three of them contained only one potassium salt, whereas the other two contained a mixture of potassium chloride and potassium carbonate in a molar ratio of $K_2CO_3$: KCL of 1:1 and 1:4, respectively. The salt of the solution, the temperature maintained for the salt layer to react with the glass for ion exchange, he time for this maintenance in the case of the oven treatment and the modules of rupture that was determined as described above using the Tinius-Olsen machine without any abrading treatment are tabulated below. The time for the treatment in the annealing lehr is not shown. The overall time was about 40 minutes, as described above, but the rods were at the various temperatures during their travel.

| Salt in sol'n sprayed | Temperature, °F. | Time in minutes | Flexural strength, p.s.i. |
|---|---|---|---|
| $K_2CO_3$ | 1,025 | 30 | 33,000 |
| $K_2CO_3$ | 975 | 30 | 36,000 |
| $K_2CO_3$ | Anneal. lehr | | 40,000 |
| KCl | do | | 17,000 |
| $K_2SO_4$ | do | | 15,400 |
| $K_2CO_3$:KCl | do | | 28,000 |
| $K_2CO_3$:4KCl | do | | 20,000 |

Rods of this glass, but without the foregoing salt-and-heat treatment and without any abrading, had a flexural strength of 16,000 p.s.i. Other samples of the rods were not sprayed but were passed through the annealing lehr, and they were found to have a flexural strength of 13,500 p.s.i. Thus the foregoing data show the improved strengths obtained by treatment with some of the salts of the present invention applied as a uniform or substantially continuous layer of salt solid at the elevated temperature maintenance that is followed by cooling and coating removal.

It would appear from the first two lines of data that the temperature below the strain point provides a higher strength than the temperature near the annealing point. However, it is believed that 30 minutes at 1025° F. is too long. A few minutes more would result in a lower flexural strength. This is substantiated by the work reported above in Example II.

It is noted that the treatment up to the annealing point using the annealing lehr resulted in the highest strength using potassium carbonate solution as the spray. It must be kept in mind that in the lehr this high temperature is not imparted to the rod for the full travel through the lehr. As a matter of fact, the time is substantially shorter than 30 minutes as described above in Example I.

EXAMPLE V

A glass has been made from a mixture of an alkali aluminosilicate material and alkaline earth material, for example a mixture of spruce pine feldspar, raw dolomite limestone and high-calcite Mississippi limestone. This glass as a composition and an article, and the process of making it are the subject of U.S. patent application Ser. No 512,235, filed Dec. 7, 1965 entitled "Process, Composition and Product," filed by one of the present applicants, Everett F. Grubb, with Joseph R. Monks and Erwin C. Hagedorn. That patent application is hereby incorporated by reference.

A glass having the following theoretical composition, on a weight percent basis was prepared in a glass melting tank using as the batch 1,328 lbs. spruce pine feldspar, 260 lbs. raw dolomite limestone, 245 lbs. high-calcite Mississippi limestone, 4 lbs. arsenic trioxide, 4 lbs. niter and 4.8 lbs. sodium antimonate to make a large number of glass containers as described in that application. The analyses of the first three batch ingredients are presented in that application.

| | |
|---|---|
| $SiO_2$ | 56.3 |
| $Al_2O_3$ | 15.6 |
| CaO | 14.8 |
| $Na_2O$ | 5.5 |
| $K_2O$ | 3.7 |
| MgO | 3.5 |
| $As_2O_3$ | 0.25 |
| $Sb_2O_3$ | 0.23 |
| $Fe_2O_3$ | 0.08 |

This glass had an annealing point of 1215° F. and a strain point of 1160° F.

A gob was taken from the glass tank and remelted in a platinum pot to obtain molten glass from which cane was pulled to produce rods, as described earlier. These rods at a temperature of about 700° F. were sprayed with potassium carbonate solution prepared as described in Example I. Then the rods were maintained in an oven at specific temperatures and for specific times, followed by gradual cooling to avoid thermal tempering. The rods were examined for depth in microns of their compressive stress surface layer and for their compression retardation in millimicrons. The data presented are tabulated below.

| Temperature, °F. | Time, minutes | Depth | Compression retardation |
|---|---|---|---|
| 1,200 | 30 | 33 | 150 |
| 1,175 | 5 | 10 | 130 |
| 1,175 | 30 | 27 | 175 |
| 1,175 | 60 | 33 | 175 |

This type of glass has an oxide composition consisting essentially, on a percent by weight basis, of:

| | |
|---|---|
| $SiO_2$ | 43–63 |
| $Al_2O_3$ | 14–25 |
| CaO | 0–30 |
| MgO | 0–20 |
| Total CaO and MgO, expressed as CaO mole equivalent | 10–30 |
| Total alkali metal oxide, expressed as $Na_2O$ mole equivalent | 5–15 | and the log viscosity of the glass at its liquidus temperature is at least 2.3, and preferably consisting essentially of:

| | |
|---|---|
| $SiO_2$ | 51–63 |
| $Al_2O_3$ | 15–22 |
| Total CaO and MgO, expressed as CaO mole equivalent | 10–22 |
| Total $Na_2O$ and $K_2O$ expressed as $Na_2O$ mole equivalent | 7–14 | and the log viscosity is at least 3.4.

The glass that is especially preferred is the composition consisting essentially of:

| | |
|---|---|
| $SiO_2$ | 54–63 |
| $Al_2O_3$ | 17–22 |
| Total CaO and MgO, expressed as CaO mole equivalent | 10–12 |
| Total $Na_2O$ and $K_2O$ expressed as $Na_2O$ mole equivalent | 8–13 | and the log viscosity is at least 4.

EXAMPLE VI

A glass was made in a large continuous furnace or tank lined with a high-alumina refractory (Monofrax M) to make a pressed glassware product. The glass had the following analyzed composition on a weight percent basis:

| | |
|---|---|
| $SiO_2$ | 70.4 |
| $Al_2O_3$ | 16.8 |
| MgO | 4 |
| $Li_2O_3$ | 3.5 |
| $ZrO_2$ | 1.3 |
| $TiO_2$ | 1.8 |
| $P_2O_5$ | 1.5 |
| F | 0.09 |
| $Na_2O$ | 0.5 |
| $As_2O_3$ | 0.15 |

The glass was made by melting at a temperature of 2900° F. for about 43 hours a mixture of the following batch materials using a slight excess of air at an oxidizing atmosphere: petalite (contains 77.7% $SiO_2$, 16.2% $Al_2O_3$, 4.2% $Li_2O$, and minor amounts of other alkali metal oxides and other impurities); flint (99.9+% $SiO_2$); Alcoa A-10 alumina (99.5% $Al_2O_3$ and minor impurities); periclase (95.3% MgO, 0.5% $Fe_2O_3$, 2.8% $SiO_2$, 0.3% $Al_2O_3$, 1.1% CaO); Florida zircon (66% $ZrO_2$, 33.5% $SiO_2$, 0.25% $TiO_2$, 0.1% $Fe_2O_3$); Titanox (substantially pure $TiO_2$); aluminum metaphosphate (substantially pure, except about 1% ignition loss); lithium fluoride (essentially pure LiF); arsenic trioxide, niter and water.

This glass had an annealing point of about 1220° F. Cane was pulled from the glass melt and a number of glass rods about 3/16 inch in diameter were prepared from the cane. These rods at temperatures between 700 and 900° F. were sprayed with a saturated sodium chloride aqueous solution to produce a very fine, thin coating of sodium chloride on the rods. The coated rods were heated for one hour at 900° F. The rods were cooled slowly and then washed with water to remove the salt layer. An ion exchange occurred whereby lithium ions in the glass were replaced by sodium ions. The depth of the compressive stress surface layer was approximately 50 microns. These rods were found to have an average flexural strength of 45,000 p.s.i. whereas glass rods that were not subjected to the sodium chloride treatment at the elevated temperature had an average flexural strength of only 19,800 p.s.i. None of these rods was subjected to any abrasion treatment prior to testing for strength.

The glass of the composition of this example is thermally crystallizable. This glass has been ion exchanged using a molten bath of sodium nitrate maintained at 750° F. for one-half and for 3 hours. The ion exchange of this type of glass-ceramic and the product from the ion exchange are disclosed and claimed in copending U.S. patent application Ser. No. 362,481 filed on Apr. 24, 1964, now Patent No. 3,428,513, by Robert R. Denman, with common assignee and entitled "Ceramics and Method." This type of glass-ceramic, the method for its manufacture and the thermally crystallizable glass from which it is made are more broadly disclosed and claimed in copending U.S. patent application Ser. No. 371,089, filed on May 28, 1964, by William E. Smith, with common assignee and entitled "Glass, Ceramics and Method." The disclosures of said patent applications Ser. Nos. 362,481 and 371,089 are hereby incorporated by reference.

The process of the present invention is not limited to the specific glass compositions that were used for the foregoing examples. The process is applicable to many other types of glasses that have been ion exchanged using alkali metal salts of inorganic acids in molten form and to other types of glass, especially silicate glass containing alkali metal ions capable of ion exchanging.

W. A. Weyl and E. C. Marboe in their book entitled "The Constitution of Glass," volume II, part one, published in 1964 by Interscience Publishers, a division of John Wiley & Son, Inc., New York, N.Y., presents information regarding many types of representative inorganic glasses. A number of these types of inorganic glasses are not the glass used in the present invention, because they do not contain alkali metal oxide and thus are not useful in the present invention which requires an alkali metal oxide, i.e., an alkali metal bonded through oxygen to the basic glass forming structure. The representative glasses useful in the present invention are the alkali metal silicate glasses, the alkali metal silicates containing alkaline earth oxide or oxides in substantial amount, which Weyl and Marboe refer to as alkali-alkaline earth silicates, alkali aluminosilicates, and alkali borosilicates. Other silicate glasses useful in the present invention include alkali metal oxide-zirconia-silica glasses, alkali metal oxide-titania-silica glasses as well as lead-alkali silicate glasses that are referred to on page 4 of the book by E. B. Shand mentioned above. Some of the phosphate glasses contain alkali metal oxide, as can be seen from page 581 of the book by Weyl and Marboe mentioned above and such glasses may be treated by the process of the present invention to form articles of this invention.

It is seen from the foregoing that there are many types of silicate glasses that contain silica and alkali metal oxide. Some contain one or more other oxides that are real or probable glass formers and some contain other oxides as glass modifiers, as these terms are used by Weyl and Marboe. Such chemical elements are shown in Table XXII on page 225 of volume I (published in 1962) of their book mentioned above. Some contain both other glass formers and other glass modifiers. These silicate glasses containing alkali metal oxide have compositions that contain the following components in the indicated percent ranges:

| | Percent by wt. |
|---|---|
| $SiO_2$ | 35-88 |
| $M_2O$ | 1-48 |
| $Al_2O_3$ | 0-40 |
| CaO | 0-15 |
| MgO | 0-28 |
| BaO | 0-15 |
| SrO | 0-15 |
| $B_2O_3$ | 0-15 |
| $ZrO_2$ | 0-25 |
| $TiO_2$ | 0-12 |
| $SnO_2$ | 0-2 |
| $P_2O_5$ | 0-10 |
| $As_2O_5$ | 0-3 |
| $Sb_2O_5$ | 0-3 | wherein $M_2O$ refers to the total of alkali metal oxide and, when the alkali metal oxide is lithium oxide, potassium oxide, rubidium oxide or cesium oxide, it constitutes a maximum of about 25% by weight of the glass composition. The content of alkali metal oxide to be at least partially replaced in a surface layer by another alkali metal oxide preferably constitutes at least 2% and for glasses, other than glass-ceramics, it is especially preferred that it constitutes at least 5%.

For those glass compositions that are thermally crystallizable to form glass-ceramics, antimony oxide or arsenic oxide is part of the batch material to form the glass. Up to about 1% by weight of either or total of both is used. They are used as fining agent or oxidizing agent. Most of these oxides are lost by vaporization in the glass-making furnace so that the final glass composition will actually contain at most only a few tenths of one percent. When arsenic oxide is used as fining agent there is commonly used also in the batch, a small amount of sodium nitrate, but it is not shown.

Flourine as a salt is commonly used in batch material as an additive in an amount usually not exceeding 0.3% by weight in the final composition. Fluorine is believed to aid crystallization; but its content of the composition is limited to a low value, because it accelerates the crystallization, sometimes with an undesirable exothermic effect.

Within this glass composition, it will be apparent to one skilled in the art that there are narrower limits to the ranges of the individual oxides depending upon which ones are present to form a compatible mixture as a melt that when cooled will be a glass. These glasses are per se no part of the present invention. Instead, they are the materials that are treated by the process of this invention to form the improved glass articles. However, various classes of glasses within this broad type are presented below for purposes of illustrating the cited variation of glasses useful in the present invention.

The simplest silicate glass containing alkali metal oxide is the binary type. As pointed out on page 17 of the book entitled "Glass-Ceramics" by P. W. McMillan published in 1964 as a U.S. edition by Academic Press Inc., New York, N.Y., two-component glasses can be prepared for combinations of alkali metal oxides with either silica, boric oxide or phosphorus pentoxide. In the case of silica, there is a limitation on the maximum mole percent of alkali metal oxide as follows: 40% for lithium oxide; 47% for sodium oxide and 50% for potassium oxide. At a higher alkali metal oxide content there will be crystallization or devitrification during cooling of the melt. Replacement of part of one alkali metal by another in such binary glasses, in accordance with the process of the present invention usually would require temperature and time factors economically unfeasible at the present time. Furthermore, mixtures of alkali metal oxides in alkali metal oxide-silica binary glasses have expansion coefficients that show a maximum for a specific ratio and partial exchange of one alkali metal for another could result in no strengthening of the glass. Again it is apparent that the mole percent of silica should not be too high or too low, at least in the case of substitution of potassium for sodium. Such expansion coefficients are shown in Table LII on page 496 of the book by Weyl and Marboe mentioned above.

In view of the foregoing relating to a binary system, the preferred glasses used in the present invention are those containing other metal oxides and/or other glass network formers in addition to alkali metal oxide and silica. The following presents various examples of multicomponent glass systems.

One example is the class of glasses composed of silica, one or more alkali metal oxide, an one or more alkaline earth metal oxide. A common glass representative of this class is the alkali-lime-silica glass, such as used for window sheet glass, plate glass and container glass. In these commercial glasses the alkaline earth metal oxide content is usually lime or a mixture of calcia and magnesia such as is present in a dolomitic lime. The approximate composition of such commercial glasses on a weight basis is as follows: 70–74% silica, 12–16% soda, either 10–13% calcia and magnesia total or 8–12% calcia and 1–4% magnesia. Alumina is present in about 0.5–1.5% by weight for sheet and plate glass while for container glass it is usually 1.5–2.5%, but in some cases exceeds 5%. This glass with the low alumina content can be ion exchanged to improve its strength as evidenced by some of the foregoing examples.

The patent application Ser. No. 504,160, mentioned above, discloses that it is possible to provide an alkali metal oxide-alkaline earth metal oxide-silica glass, containing such small amount of alumina or containing no alumina, that by ion exchange has an improved strength, even after a substantial degree of abrasion. The improvement of flexural strength of such glass using the process of the present invention is illustrated by Example III, supra.

Another class of glasses within the broad type of alkali metal silicate glasses is the lead-alkali metal silicate glass, in which the alkali metal oxide is potassium oxide alone or with soda, i.e., sodium oxide, as shown in Table I-1 on page 4 of Shand's book mentioned above. Similarly, another class of glasses is the borosilicate glass system which is illustrated by glasses numbers 10, 11 and 12 in Table I-1.

Another class of glasses useful in the present invention is the alkali aluminosilicate glass compositions which are disclosed in U.S. patent application Ser No. 181,887 filed Mar. 23, 1962, now abandoned, on which French Patent No. 1,329,124 and South African Patent No. 62/2353 are based in part. This U.S. application discloses as the broad range for such composition on a weight basis: 50–75% silica; at least 5% and preferably from 10–25% alumina; and at least 5%, preferably 10–25%, $Na_2O$, with the alumina and $Na_2O$ content preferably constituting at least 15% of the glass composition and with these two plus the silica constituting at least 85% of the glass composition. It is indicated that divalent metal oxides, potassium oxide, boron oxide, titania, phosphorus pentoxide and fluorine may be present up to a maximum individual content of 10% and collectively up to a maximum of 15%. It is also stated that lithium oxide may be present but should not exceed 1%. Because some of these limitations are based upon the attaining of the high strength even after abrasion, such limitation, although preferred, is not a limitation on the present invention.

Another class of glasses of the broad alkali metal oxide-silica type is the lithium silicate glass described in U.S. patent application Ser. No. 181,886 filed on Mar. 23, 1962, now abandoned, on which French Patent No. 1,329,125 and South African Patent No. 62/2352 are based. The U.S. application discloses that this glass contains on a weight basis 46–88% silica and 4–29% lithia. This glass may contain alumina to constitute the remainder, if any, but the ratio of silica to alumina should be at least 2:1. Thus it is seen that this class of glasses can be the binary type mentioned above, but when alumina is present it is the alkali metal aluminosilicate also mentioned above. Instead of alumina, or for part of it, there may be present one or more of the following constituents: zirconia; titania; and boron oxide. In addition other alkali metal oxides, namely, sodium oxide and potassium oxide, may be present along with lead oxide (PbO) and fluorine up to a total of 15 mole percent. Of course, some of these limitations relate to the compositions which provide the maximum mechanical strength after abrasion, but such is not a limitation for the present invention in its broadest sense.

A further class of glasses that contain ion exchangeable alkali metal ions is the glass composition disclosed in U.S. patent application Ser. No. 181,888 filed on Mar. 23, 1962, now abandoned, on which French Patent No. 1,329,126 and South African Patent No. 62/2354 are based. In this U.S. application this glass composition is described as constituting at least 10%, preferably at least 20%, by weight of sodium oxide, at least 5% by weight of zirconia and the balance silica, except for lithia (lithium oxide), if present, which normally should not exceed 1% by weight and except for optional compatible ingredients including divalent metal or oxides, potassium oxide, boron oxide, phosphorus pentoxide, titania and fluorine which individually may be present in an amount up to 10% by weight and collectively may be present in an amount up to 15% by weight. In the ternary glass system the composition can be, e.g., 60 to 75% by weight of silica, 5 to 20% by weight of zirconia and 20% by weight of sodium oxide. Again some of these limitations, not relating to glass forming, are not precise limitations relative to the present invention.

U.S. patent application Ser. No. 228,255 filed Oct. 4, 1962, now Patent No. 3,287,200, on which French Patent No. 1,375,995 is based discloses that alkali-alkaline earth metal silicate glasses, which may contain alumina, boron oxide and various compatible inorganic oxides, can be ion exchanged using alkali metal salts. These glasses contain by weight in excess of 40%, e.g., 65–75% silica, 0–15% boron oxide, 0–35% alumina, 0–25% calcium oxide, magnesia, strontia, barium oxide, lead oxide and/or zinc oxide and combinations thereof, 0–10% titania, 0–10% potassium oxide and 2–20% sodium oxide and/or lithium oxide. Typical glass compositions are described and these are ion exchanged for strengthening of the glass.

U.S. patent application Ser. No. 249,790 filed Jan. 7, 1963, now Patent No. 3,287,201, on which South African Patent No. 63/5619 is based in part, discloses glass compositions, similar to those in the foregoing U.S. application on which French Patent No. 1,375,995 is based, as capable of ion exchange. These compositions contain by weight 65-75% silica, 10-20% sodium oxide, 0-5% potassium oxide, 3-15% calcium oxide, 0-10% magnesia, 0-5% alumina and 0-5% barium oxide. Some of the sodium oxide can be replaced by additional potassium oxide.

U.S. patent application Ser. No. 252,324 filed Jan. 18, 1963, now abandoned, on which South African Patent No. 63/5747 is based in part, discloses another class of glass compositions which are alkali silicates that contain magnesia and/or zinc oxide, with or without alumina. In these compositions alkaline earth metal oxides may be absent. These glasses are stated as containing by weight in excess of 40%, e.g., 55-75% silica, 0-40% alumina, 0-25% calcium oxide, magnesia, strontia, barium oxide, lead oxide and/or zinc oxide and combinations thereof, 0-10% titania, 0-10% potassium oxide, and 2-20% sodium oxide and/or lithium oxide. A representative range for such glass composition is as follows:

| | Percent by wt. |
|---|---|
| $SiO_2$ | 55-70 |
| $Al_2O_3$ | 1-30 |
| MgO and/or ZnO | 3-10 |
| $Li_2O$ | 2-8 |
| $Na_2O$ | 4-8 |
| $K_2O$ | 0-2 |

U.S. patent application Ser. No. 264,708 filed Mar. 12, 1963, now abandoned, on which South African Patent No. 63/5619 is based in part, relates to similar glass compositions that are requred to be lithia-containing. A representative range for such glass composition is as follows:

| | Percent by wt. |
|---|---|
| $SiO_2$ | 55-75 |
| $Li_2O$ | 3-20 |
| $Na_2O$ (when present) | 1-22 |
| $K_2O$ | 0-5 |
| $Al_2O_3$ (when present) | 10-30 |
| MgO and/or ZnO | 0-5 |
| $ZrO_2$ (when present) | 3-20 |
| $Al_2O_3$ and $ZrO_2$ | 13-33 | with mole ratio of $Li_2O:Na_2O$ between 0.2:1 to 5:1 and fluorine as fining agent is present when alumina is present. In addition to the above oxides, such glasses can contain by weight: 0-10% titania; 0-3% barium oxide and/or lead oxide; and 0-1% $Sb_2O_3$, $As_2O_3$, phosphorus pentoxide and fluorine. Calcium oxide in an unstated amount may be present. Usually when both lithia and soda are present, their combined total ranges from 5-25% by weight.

All of the foregoing classes of glasses are the first of the three types of glasses mentioned above in the foregoing definition of the term "glass." The glass compositions of the second and third types, under that definition, are described below but some of them as glass-ceramics, at least resulting from a specific heat treatment may not be ion exchanged, although they are ion exchanged as the thermally crystallizable glass composition. This limitation is not peculiar to the present process. Instead it has been discovered as a limitation when using the conventional ion exchange process that utilizes a molten alkali metal nitrate.

The glass-ceramics preferably used in the present invention are opaque or translucent. Especially preferred are the opaque glass-ceramics which contain a multiplicity of crystals in a glassy matrix wherein the average diameter of the individual opaque crystals is less than about 30 microns across the largest dimension. The average lineal coefficient of thermal expansion of these opaque glass-ceramics is generally less than about $20 \times 10^{-7}/°$ C. (between 25° C. and 300° C.).

Examples of thermally crystallizable silicate glass compositions are given in U.S. Patent No. 2,920,971. On the basis of the actual contents of various ingredients of these glasses presented in that patent the range of the compositions is as follows:

| | Percent by wt. |
|---|---|
| $SiO_2$ | 56.1-73.1 |
| $Al_2O_3$ | 12.1-15.3 |
| $Li_2O$ | 3.0-5.2 |
| $Na_2O$ | 0-1.7 |
| $K_2O$ | 0-0.2 |
| CaO | 0-11.1 |
| MgO | 0-8.8 |
| $TiO_2$ | 4.5-13.8 |
| $ZrO_2$ | 0-3.9 |

In some of these compositions fluorine is present as a fining agent. These compositions after controlled thermal crystallization are glass-ceramics and some of these, provided there is suitable heat treatment, are capable of ion exchanging lithium in the glass-ceramic with an alkali metal in an inorganic salt bath and thus capable of being ion exchanged by the method of the present invention.

U.S. Patent No. 3,157,522 discloses a class of glass and glass-ceramic therefrom. The range for the composition is as follows:

| | Percent by wt. |
|---|---|
| $SiO_2$ | 55-75 |
| $Al_2O_3$ | 12-36 |
| $Li_2O$ | 2-15 |
| $TiO_2$ | 3-7 |
| $SiO_2$ and $TiO_2$ | 58-82 | with the recited ingredients constituting at least 95% of the composition and the weight ratio of $Li_2O:Al_2O_3$ being between 0.1:1 and 0.6:1.

Another class of thermally crystallizable glass composition that can be ion exchanged in the glass form and by proper heat treatment can be exchanged as a glass-ceramic is disclosed in Japanese patent Showa 37/15320 filed Sept. 27, 1962. The range of this composition is as follows:

| | Percent by wt. |
|---|---|
| $SiO_2$ | 48-73 |
| $Al_2O_3$ | 14-35 |
| $Li_2O$ | 4-10 |
| $ZrO_2$ | 2-6 | and wherein the sum of recited ingredients, other than zirconia, is greater than 85% of the composition.

Belgian Patent No. 609,529 describes another thermally crystallizable glass composition having the following composition:

| | Percent by wt. |
|---|---|
| $SiO_2$ | 48-73 |
| $Al_2O_3$ | 14-25 |
| $Li_2O$ | 4-10 |
| $TiO_2$ | 0-1.8 |
| $ZrO_2$ | 2-6 | wherein the total of the recited ingredients, other than titania and zirconia, constitutes at least 85% of the glass. Many of the specific compositions that are disclosed contain 3% by weight of $B_2O_3$.

Belgian Patent No. 633,889 discloses thermally crystallizable glass compositions and glass-ceramics therefrom, both of which can be ion exchanged to replace one alkali metal ion by another. Such compositions contain silica, alumina, lithium oxide, boron oxide and 3-7% by weight of MgO and/or ZnO plus a small quantity of a nucleating agent. The typical composition range indicates that the silica content would be 55-66% by weight, the alumina content would be 13–22% by weight and the lithium oxide content would be 2.5–5% by weight.

Another class of thermally crystallizable glass compositions that is ion exchangeable is disclosed in U.S. Patent No. 3,170,805 in which the major constituents are silica, lithium oxide and zinc oxide in the weight percent ranges of 34–81, 2–27 and 10–59, respectively. Other constituents may be present as indicated, and $P_2O_5$ in the amount of 0.5–6% by weight where metallic nucleating agents are used.

Thermally crystallizable glass compositions and glass-ceramics therefrom are disclosed in U.S. Patent application Ser. No. 464,147, filed June 15, 1965, by Clarence L. Babcock, Robert A. Busdiecker and Erwin C. Hagedorn, with common assignee entitled "Product and Process for Forming Same." This class of glass composition contains the following ingredients:

| | Percent by Wt. |
|---|---|
| $SiO_2$ | 50–75 |
| $Al_2O_3$ | 16–35 |
| $Li_2O$ | 3–5.5 |
| Nucleating agent | Variable |
| $Li_2O$ and nucleating agent | At least 5.5 |

The disclosure in the application of batch materials and method of manufacture of the glass, the heat treatment of the glass to obtain glass-ceramics, are hereby incorporated by reference.

The amount of nucleating agent, such as titania and zirconia, depends upon the particular composition and the particular nucleating agent or combination of nucleating agents etc. Metal oxides as colorants may be present in an amount of 0.005–2% by weight. To provide lower expansion characteristics to the glass-ceramic that can be formed from the glass composition, the components are as follows:

| | Percent by Wt. |
|---|---|
| $SiO_2$ | 56–68 |
| $Al_2O_3$ | 18–27 |
| $Li_2O$ | 3.4–4.5 |
| CaO | 0–3 |
| ZnO | 0–2 |
| $B_2O_3$ | 0–4 |
| $TiO_2$ | 0–6 |
| $ZrO_2$ | 0–3 |
| MgO | 0–3 |
| $Na_2O$ | 0–1 |
| $P_2O_5$ | 0–3 |
| ($SiO_2$ and $Al_2O_3$) | At least 82 |
| ($SiO_2$, $Al_2O_3$, $B_2O_3$ and $P_2O_5$) | 86–91 |
| (CaO, MgO, Zno and $Na_2O$) | 2.5–6 |
| ($SiO_2$, $Al_2O_3$, $P_2O_5$, and $Li_2O$) | No more than 93 |
| $TiO_2$ and $ZrO_2$ | 2–6 | where the ratio of (CaO, MgO, Zno, $Na_2O$ and $B_2O_3$) to $Li_2O$ is less than 2.4 and the ratio of $SiO_2$ to $Al_2O_3$ is no more than 3.3 and preferably no more than 3.8.

Another class of glass compositions as thermally crystallizable glass and as glass-ceramics is the subject of said U.S. patent application Ser. No. 352,958, now Patent No. 3,380,818. The ion exchange of this composition as thermally crystallizable glass is illustrated by Example VI, supra. The composition on a percent by weight basis consists essentially of:

| | |
|---|---|
| $SiO_2$ | 66–73 |
| $Al_2O_3$ | 15–19 |
| $Li_2O$ | 2.5–4 |
| MgO | 3–7.7 |
| $ZrO_2$ | 1–1.7 |
| $TiO_2$ | 1–<1.9 |
| $SnO_2$ | 0–1.7 |
| $P_2O_5$ | 0–3 |
| BaO | 0–5 |
| ZnO | 0–3 | where the total weight percent of $ZrO_2$, $TiO_2$, $SnO_2$ and $P_2O_5$ is at least 2.8, and the total weight percent $Li_2O$ and MgO is 6.3 to 10.5.

The glass compositions of the U.S. patent applications that are presented in the paragraphs immediately preceding form glass-ceramics containing beta-eucryptite and/or beta-spodumene. Glass compositions have been developed for thermally crystallizable glass-ceramics in which the crystals or crystallites or other materials including those in which the crystalline phase is nepheline. Such glass compositions at least as a thermally crystallizable glass can be ion exchanged. One class of such compositions is disclosed and claimed in copending U.S. patent application Ser. No. 371,089 filed on May 28, 1964 by William E. Smith, with common assignee and entitled "Glass, Ceramics and Method." This composition contains the following ingredients:

| | |
|---|---|
| $SiO_2$ | 44–52 |
| $Al_2O_3$ | 22–29 |
| $Na_2O$ | 15–22 |
| $TiO_2$ | 6–12 |
| $K_2O$ | 0–3 |
| $SiO_2$ and $Al_2O_3$ | 69–76 |
| $Na_2O$ and $K_2O$ | 17–22 | where the weight ratio of $SiO_2$ to ($Na_2O$ and $K_2O$) is between 2.1 and 3, and the mole ratio of ($Na_2O$ and $K_2O$) to $Al_2O_3$ is at least 1.02. The usually preferred $Na_2O$ range is 16–21% by weight. The disclosure in the application of batch materials and method of manufacture of the glass, the heat treatments of the glass to obtain glass-ceramics, are hereby incorporated by reference.

Another class of glass compositions that form nepheline as a crystal phase in a glass-ceramic contains the following ingredients:

| | Percent by wt. |
|---|---|
| $SiO_2$ | 45–57 |
| $Al_2O_3$ | 29–38 |
| $Na_2O$ | 13–22 |
| $TiO_2$ | [1] 1–3 |
| $ZrO_2$ | [1] 1–4 |
| BaO | [1] 2–14 |
| $SiO_2$, $Al_2O_3$ and $Na_2O$ | At least 95 |

[1] In excess over 100% of the sum of $SiO_2$, $Al_2O_3$ and $Na_2O$. $Li_2O$, $K_2O$, $P_2O_5$ and bivalent metal oxides may be present in total less than 5%.

British Patent No. 869,328 discloses glass compositions that can be ion exchanged by relacing an alkali metal ion. Such a glass system contains sodium oxide, alumina and silica with titania as a nucleating agent in combination with one or more other agents. The $Na_2O$ content is 7–34 mole percent. Metal oxides used in combination with titania are listed in the British patent and it is indicated that they must constitute at least 1.9 mole percent in excess of the total moles of silica, alumina, sodium oxide, potassium oxide and calcium oxide in the glass composition to provide a controlled thermally crystallizable glass. When crystallized the glass-ceramic contains a nepheline crystal phase.

Belgian Patent No. 618,738, which claim priority based on U.S. patent application No. 182,075 filed Mar. 23, 1962, now abandoned, relates to a process that avoids using a bath of molten salts for ion exchange of an alkali metal in a glass having a high alumina content with a different alkali metal in a salt or mixture of salts. The alumina contents of the glasses treated in the examples are above 15% by weight of the glass. It is indicated that alkali metal nitrates are particularly suitable as the ion-exchanging component of the paste. An inert fluid is used. The dried coating obtained from the paste is indicated as containing at least 10%, generally 25% and preferably between 50 and 75%, by weight of the alkali metal salt, such as alkali metal nitrate. The balance of the dry coating is preferably a clay-type material, such as ochre (a mixture of clay and iron oxide), because it forms an adherent coating on the glass. The carbonates of barium and aluminum as partial or complete substitutes for ochre is taught. The temperatures used in the ion exchange process are apparently below the strain points of the glasses but are above the melting points of the alkali metal nitrates used. Apparently the ochre or other comparable material merely assures that the molten alkali metal nitrate remains in contact with the glass surface. After the ion-exchange treatment the coating is mechanically removed such as by wiping from the surface of the glass, apparently because the clay becomes baked on the glass. In the process of the present invention, the layer of material after the ion-exchange treatment is removable simply by washing with water in some instances and with dilute nitric acid in other instances.

When glass containers are made by the blow-and-blow forming technique from a gob of molten glass, the inside surface layer is substantially free of surface defects and may be considered a pristine surface. If such container is ion exchanged by immersion in a molten salt bath to contact the outer surface with salt, vapors of the salt will contact the inside surface of the container if it is not closed. The result will be a weaker bottle, because ion exchange of the pristine surface will weaken that surface. This undesirable ion exchange of the inner surface does not occur in the present process.

The spray used in the examples was obtained by using a De Vilbiss hand gun (Type No. P–EGA–502–390F) made by De Vilbiss Co. and using pressurized air as the carrier gas.

When the ion-exchange process of the present invention is carried out by spraying to form the layer while the glass is at or near its annealing point and then maintaining it at that temperature, some etching of glass occurs if the salt is potassium carbonate and the glass is conventional flint glass as used in Examples I, II and IV. This can be avoided or minimized in a number of ways. One way is the use of the glass compositions of patent application Ser. No. 504,160 mentioned in Example III and some of the compositions of the patent application mentioned in Example V, i.e., those compositions that are substantially lime-free. Another way is to use a mixture of alkali metal carbonate and another salt of the alkali metal, e.g., the chloride. A further technique is to spray the glass while is is at a substantially lower temperature and then raise its temperature for the ion exchange. Still another way is to use a lower temperature for the ion-exchange treatment. Also the appearance of the etched surface, if undesirable for certain products can be improved by an overcoat of organic material with substantially matching refractive index. Furthermore, for certain products, etching in predetermined areas by this process is possible and will give increased strength in those areas and/or enhancing ornamental effects.

The process of the present invention can provide in addition to the improved strength a coloration to the glass. This coloration is accomplished by incorporating, in the layer of material consisting essentially of salt or salts of alkali metal, as defined above, a salt of a colored heavy metal ion, such as cobalt, that will provide a diffusion of the colored metal in the glass during the elevated temperature treatment for the ion exchange, preferably with the alkali metal salt (carbonate) and at the temperature for ion exchange with etching, mentioned above. Other heavy metals are iron and nickel. Their heavy salts, that are used, do not melt at the elevated temperature used for the ion exchange. Thus their colored salts are, for example, chlorides, carbonates and sulfates of the heavy metals. Such salts constitute less than about 10%, and preferably less than about 5%, by weight of the alkali metal salt content of the solid layer formed on the glass in the first step of the ion-exchange process.

Dilute nitric acid has been mentioned in various examples as being used for removal of alkali metal carbonate, specifically potassium carbonate, from the glass surface after the ion exchange. It was 3 N nitric acid. Other concentrations of aqueous nitric acid have been used. As a matter of fact, potassium carbonate, e.g., can be removed merely by washing with water but such removal takes longer and uses a larger volume of wash liquid. Of course, therefore, the concentration of nitric acid can be varied widely to provide easy removal of salt layer from the surface of the glass.

We claim:
1. A process for treating an article composed of an inorganic glass containing ions of an alkali metal expressed as oxide, which comprises:
   (1) applying to the glass article a mixture of a salt of a different alkali metal and water, or an organic liquid or mixture thereof, forming on at least an area of a surface of said glass of the article a substantially continuous layer of material consisting essentially of salt of a different alkali metal having an ionic diameter greater than that of the alkali metal ion in the glass, said alkali metal oxide in said glass at least in a surface layer at said area being present in said glass in at least about 2% by weight expressed as soda mole equivalent;
   (2) maintaining said surface area of glass and said layer of material at an elevated temperature sufficiently high and at or above the strain point of the glass but below the softening point for a period of time for about 5 to 30 minutes whereby some of said alkali metal of the glass in the surface layer of the glass to exchange with said different alkali metal to provide a compressive stress surface layer in the glass article in said layer but for a time insufficient to provide such ion exchange to a substantial degree in the interior portion of the glass of the article and for a time insufficient to provide substantial stress relaxation of said glass in said surface layer of said area; and
   (3) cooling the glass article to a temperature at which said ion exchange does not occur, said layer of material and said alkali metal salt therein being removable by dilute nitric acid from said glass after said maintenance at said elevated temperature.

2. A process as defined in claim 1 in which the alkali metal salt constitutes at least 90% by weight of said layer of material formed on said area of said glass, the inorganic glass is a silicate glass, and the alkali metal oxide in said glass constitutes, expressed as soda mole equivalent, at least 5% by weight of the glass in at least said surface layer at said area of the glass.

3. The process of claim 1 wherein the alkali metal oxide in at least the surface area of the glass is soda and wherein the alkali metal salt of the layer formed on the glass at said area contains potassium carbonate in a molar ratio of potassium carbonate to the total of any other potassium salt present in the layer in at least 1:5 and wherein the elevated temperature being at about the annealing point of the glass.

4. The process of claim 1 wherein said glass is other than a glass-ceramic and wherein said elevated temperature is between the strain point of the glass and a temperature of about 100° F. above the annealing point of the glass.

5. The process of claim 1 wherein the inorganic glass is a silicate glass and wherein the glass contains as its ingredients, expressed as oxides, the following in weight percent ranges:

| | |
|---|---|
| $SiO_2$ | 35–88 |
| $M_2O$ | 1–48 |
| $Al_2O_3$ | 0–40 |
| CaO | 0–15 |
| MgO | 0–28 |
| BaO | 0–15 |
| SrO | 0–15 |

| | |
|---|---|
| $B_2O_3$ | 0–15 |
| $ZrO_2$ | 0–25 |
| $TiO_2$ | 0–12 |
| $SnO_2$ | 0–2 |
| $P_2O_5$ | 0–10 |
| $As_2O_5$ | 0–3 |
| $Sb_2O_5$ | 0–3 | wherein $M_2O$ refers to the total of alkali metal oxide.

6. A process as defined in claim 1 in which the salt of said different alkali metal is a carbonate and wherein the alkali metal salt of the layer contains such carbonate to a total of all other salts of said different alkali metal present in the layer in a molar ratio of at least 1:5, and the inorganic glass is a silicate glass and wherein the glass contains as its ingredients, expressed as oxides, the following in weight percent ranges:

| | |
|---|---|
| $SiO_2$ | 35–88 |
| $M_2O$ | 1–48 |
| $Al_2O_3$ | 0–40 |
| CaO | 0–15 |
| MgO | 0–28 |
| BaO | 0–15 |
| SrO | 0–15 |
| $B_2O_3$ | 0–15 |
| $ZrO_2$ | 0–25 |
| $TiO_2$ | 0–12 |
| $SnO_2$ | 0–2 |
| $P_2O_5$ | 0–10 |
| $As_2O_5$ | 0–3 |
| $Sb_2O_5$ | 0–3 | wherein $M_2O$ refers to the total of alkali metal oxide.

7. The process of claim 6 wherein the glass is a soda-lime-silica glass and said carbonate is potassium carbonate.

8. The process of claim 7 and further including the removal of said layer of material from said surface area of glass after said maintenance at said elevated temperature by washing with dilute nitric acid.

9. In the process of making bottles of container glass, containing sodium ions expressed as sodium oxide, by forming a bottle from a quantity of molten glass at a forming station, transferring the newly-formed bottle to an annealing station at a temperature at or above the strain point of the glass, but below the softening point, moving the bottles through the annealing station to remove stresses created in the glass by the bottle-forming operation, and cooling the bottle from the annealing station to a moderate elevated temperature that is substantially below the strain point of the glass, the improvement which comprises:
(1) applying to the outer surface of the newly-formed bottle, before its movement through the annealing station, an aqueous solution of potassium salt to provide a layer of material consisting essentially of the potassium salt; and
(2) removing said layer after movement of the bottle through the annealing station to provide a strengthened bottle by ion exchange of the potassium for the sodium.

10. The process of claim 9 wherein the aqueous solution is applied as a spray in air as a carrier gas.

11. The process of claim 10 wherein the glass is essentially the composition of flint container glass.

12. The process of claim 10 wherein the glass is an alkali-alkaline earth silicate glass composition comprising on a weight basis about 12% to about 20% $Na_2O$, about 5% to about 20% MgO, between 0% and less than 10% $Al_2O_3$, 0% to about 2% $Li_2O$, 0% to about 5% $K_2O$, 0% to about 5% CaO, and $SiO_2$, said $Na_2O$ and MgO constituting at least 23% of the glass, said $Na_2O$, MgO, $Al_2O_3$ and $SiO_2$ constituting at least 90% of the glass, the weight ratio of CaO:MgO being a maximum of 1:1, said $Li_2O$ content being a maximum of about 1% in the absence of $Al_2O_3$ and said glass composition having in the absence of $Al_2O_3$ content a mole ratio of MgO:$Na_2O$ between 0.4:1 and 1.25:1 and in the presence of $Al_2O_3$ content a mole ratio of total of MgO and $Al_2O_3$ to $Na_2O$ between 0.5:1 and 1.25:1.

13. The process of claim 10 wherein the potassium salt is potassium carbonate and wherein the glass is a soda-alkaline earth oxide-silica glass having an oxide composition consisting essentially, on a percent by weight basis, of:

| | |
|---|---|
| $SiO_2$ | 43—63 |
| $Al_2O_3$ | 14–25 |
| CaO | 0–30 |
| MgO | 0–20 |
| Total CaO and MgO, expressed as CaO mole equivalent | 10–30 |
| Total alkali metal oxide, expressed as $Na_2O$ mole equivalent | 5–15 | and the log viscosity of the glass at its liquidus temperature is at least 2.3.

14. A glass article having a compressive stress surface layer obtained by the process of claim 1.

References Cited

UNITED STATES PATENTS 3,000,761  9/1961  Levi _____ 117—124

FOREIGN PATENTS 966,734  6/1962  Great Britain.
62/2352  5/1962  Republic of South Africa.

OTHER REFERENCES

P. Le Clerc, "Diffusion Characteristics of Mobile Ions in a Vitreous Network," Travaux du IV, Congress International du Verre (July 2–5, 1956), pp. 331–335.

S. S. Kistler, "Stresses in Glass Produced by Non-Uniform Exchange of Monovalent Ions," J. of Am. Ceram. Soc., vol. 45, No. 2, pp. 59–68, February 1962.

S. LEON BASHORE, Primary Examiner

JOHN H. HARMON, Assistant Examiner

U.S. Cl. X.R.

65—60; 117—124; 161—1